No. 858,151. PATENTED JUNE 25, 1907.
F. D. CHESBOROUGH.
WEFT FORK AND SLIDE FOR LOOMS.
APPLICATION FILED JAN. 5, 1906. RENEWED MAY 25, 1907.

UNITED STATES PATENT OFFICE.

FREDERICK D. CHESBOROUGH, OF FALL RIVER, MASSACHUSETTS.

WEFT FORK AND SLIDE FOR LOOMS.

No. 858,151.            Specification of Letters Patent.            Patented June 25, 1907.

Application filed January 5, 1906. Renewed May 25, 1907. Serial No. 375,694.

*To all whom it may concern:*

Be it known that I, FREDERICK D. CHESBOROUGH, a citizen of the United States of America, and a resident of Fall River, in the county of Bristol and Commonwealth of Massachusetts, have invented an Improvement in Weft Forks and Slides for Looms, of which the following description, in connection with the accompanying drawings, is a specification, like characters on the drawings representing like parts in the different figures and in the description.

This invention has for its object to provide a weft-fork having tines of the usual form which are detachable from the part of the fork which is fastened into the slide and which are also adjustable vertically. This construction enables the tines to be replaced or adjusted without removing the fork from the slide.

Another object of my invention is to provide a weft-fork and slide in which the movement of the fork caused by its contact with the shuttle or shuttle-thread is suitably limited.

Figure 1:
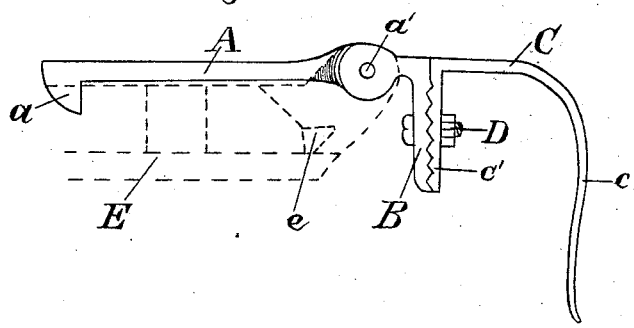
Figure 2:
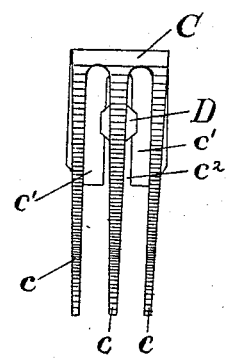
Figure 3:
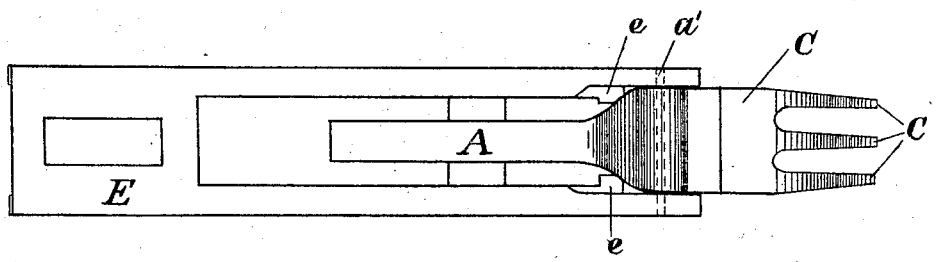

Figure 1 is a side view of my weft-fork showing in dotted lines an inside view of the slide on which the fork is mounted. Fig. 2 shows a front view of my weft fork. Fig. 3 shows a top view of my weft fork mounted in the slide.

In the drawings A represents the shank of my weft fork pivoted in the slide E on the rivet $a'$. The part of A in front of the pivot is bent downward substantially at right angles to the line of the shank, and is made wide enough to hit the lugs $e\ e$ on the inside of the slide E when the fork is tilted too far. The front surface of the shank portion is corrugated, as shown at B, to engage corresponding corrugations on the base of the tine portion, and thereby prevent, the tine portion from slipping, and losing its adjustment. The tine portion is entirely separable from the shank portion and is preferably a steel stamping. Its rear end $c'$ is bent downward so as to be substantially vertical when the tines are in position and is adapted to engage the corrugations on B. $c'$ is slotted as shown at $c^2$ to allow adjustment of the tine portion on the shank portion, the adjustment being retained by the screw and nut D. It may also be slotted horizontally for adjustment. This capacity for adjustment enables the tines to be suitably adjusted with reference to the lay and the shuttle-thread. When tines get injured, the tine portion can be readily replaced without removing the fork from the slide. The front part of the tine portion is bent downward in a curve as shown at $c$ and shaped into tines of the usual form. The shank portion may be made of malleable cast iron, and the tine portion as above stated may be stamped from steel. I thus secure an inexpensive and efficient construction. Upon the inside of the slide E are two projecting lugs $e$, $e$ against which the part B strikes when the weft fork is tilted too far, thereby limiting the upward motion of the shank by the contact of B with $e\ e$.

Having thus described my said invention I claim:

1. In a weft-fork a shank portion having a vertical front face in combination with the separate tine portion, having a base adapted to engage the face of said shank portion, and reaching forward and downward from said base, and shaped into pointed tines of the usual form and means for securing the tine portion to the shank portion.

2. In a weft-fork a shank portion having a vertical front face, in combination with a tine portion, having means for securing a vertical adjustment thereon, said tine portion having a base adapted to engage the face of said shank portion, and reaching forward and downward from said base, and shaped into pointed tines of the usual form.

3. In a weft fork in combination a slide, a shank portion adapted to be pivoted in the slide, a separable tine portion having a base adapted to engage said shank portion and extending forward and downward from said base and shaped into pointed tines, and means for securing a vertical adjustment of said tine portion on said shank portion.

FREDERICK D. CHESBOROUGH.

Witnesses:
    J. M. MARTIN, Jr.,
    ARTHUR F. NELSON.